US009600717B1

(12) United States Patent
Dai et al.

(10) Patent No.: US 9,600,717 B1
(45) Date of Patent: Mar. 21, 2017

(54) REAL-TIME SINGLE-VIEW ACTION RECOGNITION BASED ON KEY POSE ANALYSIS FOR SPORTS VIDEOS

(71) Applicant: Zepp Labs, Inc, Los Gatos, CA (US)

(72) Inventors: Xiaowei Dai, Beijing (CN); Jiangyu Liu, Beijing (CN); Zheng Han, Beijing (CN); Zeyu Liu, Beijing (CN)

(73) Assignee: Zepp Labs, Inc., Los Gatos, CA (US)

( * ) Notice: Subject to any disclaimer, the term of this patent is extended or adjusted under 35 U.S.C. 154(b) by 0 days.

(21) Appl. No.: 15/053,773

(22) Filed: Feb. 25, 2016

(51) Int. Cl.
*G06K 9/00* (2006.01)
*G06T 7/20* (2006.01)
(Continued)

(52) U.S. Cl.
CPC ..... *G06K 9/00342* (2013.01); *G06K 9/00335* (2013.01); *G06K 9/00369* (2013.01); *G06K 9/00624* (2013.01); *G06K 9/00711* (2013.01); *G06K 9/00724* (2013.01); *G06K 9/6217* (2013.01); *G06K 9/6269* (2013.01);
(Continued)

(58) Field of Classification Search
CPC ......... G06T 7/2093; G06T 2207/10016; G06T 2207/20081; G06T 2207/30196; G06T 2207/30221; G06K 9/00342; G06K 9/00348; G06K 9/00355; G06K 9/00362; G06K 9/00369; G06K 9/00624; G06K 9/00664; G06K 9/00684; G06K 9/00697; G06K 9/00711; G06K 9/00724; G06K 2009/00738; G06K 9/00778; G06K 9/00805; G06K 9/6217; G06K 9/6269; G06K 9/00261; G06K 9/00335; G06N 799/005; G06N 3/08; G06N 3/088
See application file for complete search history.

(56) References Cited

U.S. PATENT DOCUMENTS 5,610,590 A 3/1997 Johnson et al.
5,819,206 A 10/1998 Horton et al.
(Continued)

OTHER PUBLICATIONS

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.
(Continued)

*Primary Examiner* — Manav Seth
(74) *Attorney, Agent, or Firm* — Fenwick & West LLP

(57) ABSTRACT

A system is provided for real-time single-view action recognition for sports videos based on key pose analysis of the sports videos. A training module of the system trains feature models for a sports action distinctively associated with each sports type using a large corpus of training videos. The trained feature models include a player detector for detecting locations of a player in video frames of a training video, a set of key pose identifiers for identifying distinctive poses of a sports action associated with a type of sports, and a meta classifier for determining a likelihood that the sports action has happened in a sports video based on the key poses analysis. Responsive to an input sports video being received for real-time action recognition, a set of trained feature models associated with the sports type of the input video are selected and applied to the input video.

20 Claims, 11 Drawing Sheets

(51) Int. Cl.
*G06K 9/62* (2006.01)
*G06N 3/08* (2006.01)

(52) U.S. Cl.
CPC ............. *G06N 3/08* (2013.01); *G06T 7/2093* (2013.01); *G06T 2207/10016* (2013.01); *G06T 2207/20081* (2013.01); *G06T 2207/30196* (2013.01); *G06T 2207/30221* (2013.01)

(56) References Cited

U.S. PATENT DOCUMENTS

| | | | |
|---|---|---|---|
| 6,224,493 B1 | 5/2001 | Lee et al. | |
| 6,400,996 B1* | 6/2002 | Hoffberg | G05B 19/0426 370/218 |
| 6,567,536 B2* | 5/2003 | McNitt | A61B 5/1124 348/E7.09 |
| 7,209,588 B2* | 4/2007 | Liang | A61B 5/1113 119/421 |
| 7,433,495 B2* | 10/2008 | Rui | G06K 9/00234 382/103 |
| 7,780,450 B2* | 8/2010 | Tarry | A63B 24/0003 434/247 |
| 7,800,480 B1* | 9/2010 | Joseph | A63B 24/0021 340/10.1 |
| 7,916,171 B2* | 3/2011 | Sugano | G06F 17/30799 348/143 |
| 7,978,081 B2 | 7/2011 | Shears et al. | |
| 8,019,702 B1* | 9/2011 | Gargi | G06K 9/00523 706/12 |
| 8,109,816 B1 | 2/2012 | Grober | |
| 8,282,487 B2 | 10/2012 | Wilson et al. | |
| 8,337,335 B2 | 12/2012 | Dugan | |
| 8,409,024 B2 | 4/2013 | Marty et al. | |
| 8,409,025 B2 | 4/2013 | Stites et al. | |
| 8,418,085 B2* | 4/2013 | Snook | G06F 3/017 715/707 |
| 8,449,402 B2 | 5/2013 | Jaekel et al. | |
| 8,465,376 B2* | 6/2013 | Bentley | A63B 24/0006 473/219 |
| 8,523,696 B2 | 9/2013 | Kamino et al. | |
| 8,589,114 B2 | 11/2013 | Papadourakis | |
| 8,593,286 B2 | 11/2013 | Razoumov et al. | |
| 8,649,613 B1* | 2/2014 | Leung | G06K 9/00724 382/155 |
| 8,903,521 B2 | 12/2014 | Goree et al. | |
| 8,905,855 B2 | 12/2014 | Fitzpatrick et al. | |
| 8,941,723 B2 | 1/2015 | Bentley et al. | |
| 8,944,928 B2* | 2/2015 | Kaps | G06T 13/40 473/199 |
| 8,956,238 B2 | 2/2015 | Boyd et al. | |
| 9,031,279 B2* | 5/2015 | Gefen | G06T 7/204 382/103 |
| 9,039,527 B2 | 5/2015 | Bentley et al. | |
| 9,076,041 B2* | 7/2015 | Bentley | A63F 13/00 |
| 9,128,528 B2* | 9/2015 | Tian | G06F 3/017 |
| 9,437,012 B2* | 9/2016 | Gefen | G06T 7/204 |
| 9,449,230 B2* | 9/2016 | Han | G06T 7/0044 |
| 2002/0164567 A1* | 11/2002 | Katayama | A63B 24/0003 434/252 |
| 2003/0095186 A1* | 5/2003 | Aman | A63B 24/0021 348/162 |
| 2004/0208342 A1* | 10/2004 | Morozumi | A63B 24/0003 382/103 |
| 2005/0032582 A1 | 2/2005 | Mahajan et al. | |
| 2005/0272516 A1 | 12/2005 | Gobush | |
| 2006/0025229 A1 | 2/2006 | Mahajan et al. | |
| 2006/0166738 A1* | 7/2006 | Eyestone | A63B 15/005 463/36 |
| 2006/0280365 A1* | 12/2006 | Gong | G06F 17/30802 382/173 |
| 2007/0279494 A1* | 12/2007 | Aman | G01S 3/7864 348/169 |
| 2008/0085778 A1 | 4/2008 | Dugan | |
| 2009/0048044 A1 | 2/2009 | Oleson et al. | |
| 2009/0083010 A1* | 3/2009 | Qi | G06K 9/00711 703/2 |
| 2009/0202114 A1* | 8/2009 | Morin | A63F 13/12 382/118 |
| 2010/0103269 A1 | 4/2010 | Wilson et al. | |
| 2010/0144414 A1 | 6/2010 | Edis et al. | |
| 2010/0323794 A1 | 12/2010 | Su | |
| 2011/0263946 A1* | 10/2011 | el Kaliouby | A61B 5/1128 600/300 |
| 2012/0089545 A1* | 4/2012 | Mei | G06K 9/6257 706/20 |
| 2012/0123978 A1* | 5/2012 | Toderice | G06F 17/30799 706/12 |
| 2012/0231840 A1* | 9/2012 | Calman | G06K 9/00342 455/556.1 |
| 2013/0263181 A1* | 10/2013 | Impollonia | H04N 21/812 725/32 |
| 2013/0330055 A1* | 12/2013 | Zimmermann | G06F 17/30817 386/240 |
| 2014/0143183 A1* | 5/2014 | Sigal | G06N 99/005 706/12 |
| 2015/0248917 A1* | 9/2015 | Chang | H04N 21/8549 386/282 |

OTHER PUBLICATIONS

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.
Bishop, R., "LabVIEW 8 Student Edition," 2007, 12 pages, Pearson Prentice-Hall, Upper Saddle River, NJ.
First Annual "Better Golf Through Technology," Better Golf Through Technology Conference, Feb. 17-18, 2006, 1 page, [Archived on web.archive.org on Mar. 14, 2006] Can be Retrieved at <URL:https://web.archive.org/web/20060314063211/http:/www.bettergolfthroughtechnology.com/>.
Home Page for "Concept2: Training," 1 page, [Archived on web.archive.org on Feb. 5, 2009] Can be Retrieved at <URL:http://web.archive.org/web/20090205092657/http://concept2.com/us/training/default.asp>.
Home Page For Expresso.com, 2 pages, [Archived on web.archive.org on Apr. 29, 2009] Can be Retrieved at <URL:http://web.archive.org/web/20090426023759/http://expresso.com/products_services/index.html#>.
Honan, M., "Apple unveils iPhone," Macworld, Jan. 89, 2007, 4 Pages, can be retrieved at <URL:http://www.macworld.com/article/1054769/iphone.html>.
Invensense, "InvenSense™ Unveils World's 1st IMU Solution for Consumer Appl.s" InvenSense, Apr. 6, 2010, 2 pages.
Kalia, M., et al., "Efficient Policies for Increasing Capacity in Bluetooth: An Indoor Pico-Cellular Wireless System," IBM India Research Laboratory, 2000, 5 pages.
Linx Technologies, "HP3 Series Transmitter Module Data Guide" Linx Technologies, Inc., 2008, Revised Jul. 27, 2011, 13 Pages.
Otto, C., et al., "System Architecture of a Wireless Body Area Sensor Network for Ubiquitous Health Monitoring," Journal of Mobile Multimedia, 2006, pp. 307-326, vol. 1, No. 4.
Rao, R., et al., "Demand-based Bluetooth Scheduling," Pennsyvania State University, Sep. 27, 2001, 13 pages, Can be retrieved at <URL:http://www.cse.psu.edu/~gik2/papers/Bluetooth1.doc>.
Roving Networks, "Blue Sentry RN-8005-CB Data Sheet," 2009, 1 page.
Sanders, K., "Japanese Wii Price, Release Date Revealed," IGN US, Sep. 13, 2006, 1 Page, can be retrieved at <URL:http://www.ign.com/articles/2006/09/14/japanese-wii-price-release-date-revealed>.
SmartSwing, "SmartSwing Introduces Affordable Intelligent Golf Club," Press Release, Jul. 19, 2005, 2 pages, [Archived on web.archive.org on Jun. 13, 2006] Can Be Retrieved at <URL:https://web.archive.org/web/20060613114451/http://www.smartswing-golf.com/site/news/pr_2006_jan_23_aus.html>.

(56) References Cited

OTHER PUBLICATIONS

Solid State Technology, "MEMS Enable Smart Golf Clubs," Extension Media, Jan. 6, 2005, 3 pages,[Archived on web.archive.org on Jan. 15, 2016] Can be Retrieved at <URL:https://web.archive.org/web/20160115202844/http://electroiq.com/blog/2005/01/mems-enable-smart-golf-clubs/>.
Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.
The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.
The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.
The iClub System™ "iClub.net—Product IClub", Fortescue Corp. 2001-2005, 1 Page, [Archived on web.archive.org on Apr. 14, 2005] Can be Retrieved at <URL:https://web.archive.org/web/20050414233840/http://www.iclub.net/products-iclube.html.
The iClub System# "iClub.net—Products IClub (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.
The iClub Product Brochure, 2001-2005, 2 pages.
Tuite, D., "Motion-Sensing MEMS Gyros and Accelerometers Are Everywhere," Electronic Design, Jul. 9, 2009, 6 pages, Can be retrieved from <URL:http://electronicdesign.com/analog/motion-sensing-mems-gyros-and-accelerometers-are-everywhere>.
Webster's New College Dictionary, Definition for "Virtual Reality," (3rd ed. 2008), 3 Pages.
Webpage for zigbees.com, 4 Pages, [online] [retrieved on Mar. 14, 2016] Can be retrieved at <URL:http://www.zigbees.com/h_start.htm>.
Wheeler, A, et al., "Introduction to Engineering Experimentation," 2nd Edition, 2004, Chapter 4, 10 pages, Pearson—Prentice-Hall, Upper Saddle River, NJ.
Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.
Affidavit of Christopher Butler dated Jan. 25, 2016 regarding "SmartWing Intelligent Clubs," 46 Pages.
[Archived on web.archive.org on Apr. 11, 2006] Can be Retrieved at <URL:https://web.archive.org/web/20060411113841/http://www.smartswinggolf.com/site/>.
Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/defaultasp>.
Certified File History of U.S. Pat. No. 8,905,855, Feb. 2, 2016, 709 Pages.
Certified File History of U.S. Pat. No. 8,941,723, Feb. 2, 2016, 929 Pages.
File History of U.S. Pat. No. 8,903,521, 2015, 406 pages.
Certified File History of U.S. Pat. No. 8,944,928, Feb. 2, 2016, 647 Pages.
Certified File History of U.S. Pat. No. 9,039,527, Feb. 2, 2016, 1047 Pages.
Declaration of Dr. Steven M. Nesbit, U.S. Pat. No. 8,905,855, Feb. 24, 2016, 235 Pages.
Declaration of Dr. Steven M. Nesbit, U.S. Pat. No. 8,941,723, Feb. 24, 2016, 219 Pages.
Declaration of Dr. Steven M. Nesbit, U.S. Pat. No. 8,903,521, Feb. 24, 2016, 250 Pages.
Declaration of Dr. Steven M. Nesbit, U.S. Pat. No. 8,944,928, Feb. 24, 2016, 195 Pages.
Declaration of Dr. Steven M. Nesbit, U.S. Pat. No. 9,039,527, Feb. 24, 2016, 227 Pages.
Curriculum Vitae of Dr. Steven M. Nesbit, Feb. 24, 2016, 10 pages.
Claim Limitation Reference Nos. '855 Petition, Feb. 24, 2016, 6 pages.
Claim Limitation Reference Nos. '723 Petition, Feb. 24, 2016, 5 pages.
Claim Limitation Reference Nos. '521 Petition, Feb. 24, 2016, 4 pages.
Claim Limitation Reference Nos. '928 Petition, Feb. 24, 2016, 3 pages.
Claim Limitation Reference Nos. '527 Petition, Feb. 24, 2016, 4 pages.
Aggarwal, J., et al., "Human activity analysis: A review." ACM Computing Surveys (CSUR) 43.3 (2011): 16, 47 Pages.
Appel, R., et al. "Quickly boosting decision trees-pruning underachieving features early." JMLR Workshop and Conference Proceedings. vol. 28. JMLR, 2013, 12 Pages.
Cheng, G., et al. "Advances in Human Action Recognition: A Survey." arXiv preprint arXiv:1501.05964 Jan. 27, 2015, 30 Pages.
Chéron, G., et al., "P-CNN: Pose-based CNN Features for Action Recognition." arXiv preprint arXiv:1506.03607(2015), 9 Pages.
Cortes, C., et al., "Support-vector networks". Machine Learning, 1995, 20 (3): 273, 31 Pages.
Dollár, P., et al. "Fast feature pyramids for object detection." Pattern Analysis and Machine Intelligence, IEEE Transactions on 36.8 (2014): 1532-1545.
Dollár, P., et al. "Integral Channel Features." BMVC. vol. 2. No. 3. 2009, 11 Pages.
Khan, F., et al. "Deep Semantic Pyramids for Human Attributes and Action Recognition." Image Analysis. Springer International Publishing, 2015, pp. 341-353.
Lin, Z., "Recognizing actions by shape-motion prototype trees." Computer Vision, 2009 IEEE 12th, International Conference on. IEEE, 2009, 8 Pages.
Liu, L., et al., "Boosted key-frame selection and correlated pyramidal motion-feature representation for human action recognition." Pattern Recognition 46.7 (2013), pp. 1810-1818.
Rodriguez, M., et al., Action MACH: A Spatio-temporal Maximum Average Correlation Height Filter for Action Recognition, Computer Vision and Pattern Recognition, 2008, 8 Pages.
Thurau, C., et al., "Pose primitive based human action recognition in videos or still images." Computer Vision and Pattern Recognition, 2008. CVPR 2008. IEEE Conference on. IEEE, 2008, 8 Pages.
Tian, Y., et al., "Spatiotemporal deformable part models for action detection." Computer Vision and Pattern Recognition (CVPR), 2013 IEEE Conference on. IEEE, 2013, 8 Pages.
Ubersense.com, (2015). Video Analysis & Sports Coaching App | Ubersense. [online] Available at: http://www.ubersense.com/ [Accessed Jul. 7, 2015], Archived on web.archive.org on Jul. 11, 2015, 4 Pages, Can be retrieved at <URL:http://web.archive.org/web/20150711062220/http://www.ubersense.com/>.

* cited by examiner

REAL-TIME SINGLE-VIEW ACTION RECOGNITION BASED ON KEY POSE ANALYSIS FOR SPORTS VIDEOS

BACKGROUND

This disclosure relates generally to digital content processing, and more specifically to real-time, single view action recognition based on analysis of key poses of sports videos.

Smart computing devices, such as smart phones and tablet computers, have become increasingly popular. The increased availability and bandwidth of network access (for wired and wireless network) has enabled a variety of mobile applications for digital content processing with improved efficiency to enhance user experience with mobile applications. For example, a user may use a mobile application to record videos of him/her playing golf with his/her smart phone and to save the sports actions performed by the user, e.g., golf swings, such that the recorded sports actions can be compared with sports actions performed by professional athletes later. To compare sports actions by the user with those performed by professional athletes, the mobile application needs to be able to recognize sports actions recorded by the user's smart phone. Recognizing sports actions for a sports video is to find out whether a sports action (e.g., a baseball swing or a golf swing) has happened in the video frames of the sports video.

Various solutions for player action recognition in sports video were proposed based on e.g., machine learning techniques, exemplar-based multi-view analysis. For example, machine learning technologies are used to train feature models based on a large corpus of sports videos. The trained feature models are applied to input sports videos for real-time action recognition. However, conventional solutions based on machine learning techniques for training feature models often rely on manual classification to select video frames showing specific sports actions, which is computationally expensive and challenging to efficiently recognize sports actions in a large corpus of video frames. Additionally, existing solutions are generally not suited for real-time action recognition, especially for videos captured by mobile computing devices with limited computational power, which degrade user experience with sports videos.

SUMMARY

Embodiments of the disclosure includes is a system (or a computer implemented method or a non-transitory computer readable medium) for real-time single-view action recognition for sports videos based on analysis of identified key poses of sports videos by a set of trained feature models. A single-view of a sports video refers to a designated view point, from which the sports video is recorded. Key poses of a sports video are associated with the type of the sports video, e.g., golf, baseball and tennis; key poses of a sports action in a sports video of a particular type of sports refer to a set of visually distinctive postures/poses in a specific order when a player performs the sports action. Different types of sports videos, e.g., golf, baseball, have different key poses identified by the disclosed system. For example, a baseball swing is represented by a set of three key poses (e.g., a begin pose, an impact pose, and an end pose), which distinguish from key poses of other sports types such as a golf swing of a golf sports video. Real-time, single-view action recognition based on key pose analysis for a sports video refers to determining whether a sports action for a specific sports type (e.g., a baseball swing for a baseball sports video) has happened in the videos frames of the sports video based on the analysis of identified key poses of the sports action with respect to the timeline of the video frames of the sports video.

An embodiment of the method comprises receiving multiple training videos, each of which is associated with a sports type, e.g., a baseball video, and a distinctive sports action, e.g., a baseball swing. Each sports action associated with a type of sports is represented by a set of distinctive poses. For each sports type, one or more feature models are trained using the training videos. For example, for a specific sports action, e.g., a baseball swing, a set of feature models, e.g., a player detector, a set of key pose identifiers and a meta classifier, are trained using the training videos. When an input sports video of a specific sports type is received for real-time action recognition, the method selects the set of trained feature models for the requested specific sports type, and applies the set of trained feature models to the received input sports video to generate real-time action recognition result. The action recognition result is provided to the user in real-time as the sports video is received from the user and a final report indicating a complete recognition result is also presented to the user.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION OF THE FIGURES

Figure 1:
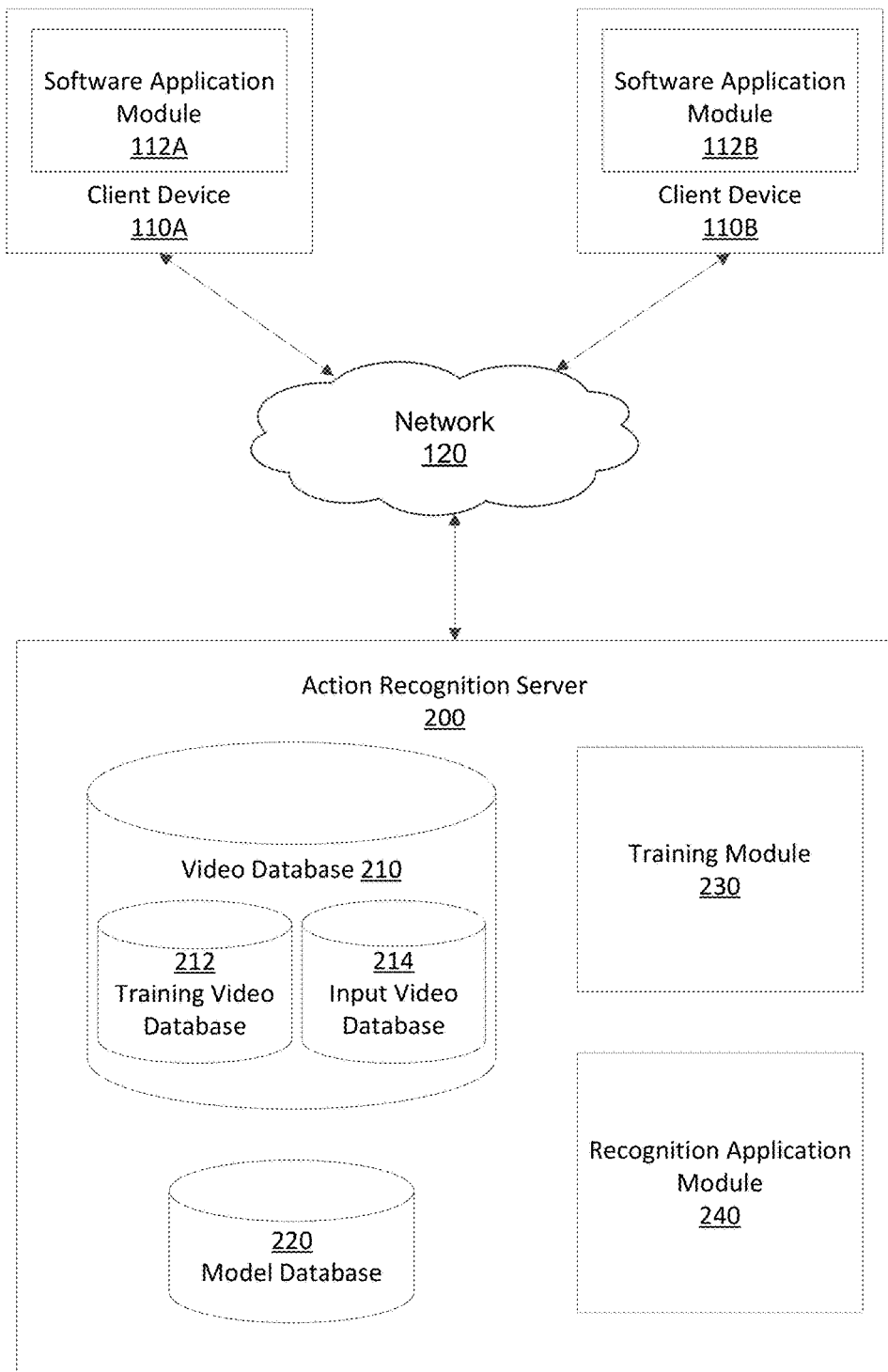
FIG. 1 is a block diagram of a system environment for action recognition for sports videos based on key pose analysis, according to one embodiment.

FIG. 1 is a block diagram of a system environment 100 for action recognition for sports videos based on key pose analysis, according to one embodiment. In the embodiment of FIG. 1, the system environment 100 includes one or more client devices 110A-110B, and an action recognition server 200 connected over a network 120. Only two client devices 110 and one action recognition server 200 are shown in FIG. 1 in order to simplify the description. Other embodiments of the system environment 100 can have multiple client devices 110 and recognition servers 200 through the network 120. Likewise, the functions performed by the various entities of FIG. 1 may differ in different embodiments.

A client device 110 is an electronic device used by a user to perform functions such as recording a sports video, consuming digital content, executing software applications, browsing websites hosted by web servers on the network 120, downloading and uploading files (e.g., uploading a sports video and downloading a sports action recognition result), and the like. Example client devices include a smart phone, or tablet, laptop, or desktop computer. The client device 110 includes and/or interfaces with a display device on which the user may view videos and other content. Additionally, the client device 110 provides a user interface (UI), such as physical and/or on-screen buttons, with which the user may interact with the client device 110 to perform functions such as viewing, selecting, and consuming digital content. The client device 110 may also include a digital camera or a component cable of being used by a user of the client device 110 to capture sports videos.

In one embodiment, each of the client devices 110 further includes a software application module 112 executing a software application on the client device 110 for sports action recognition. For example, the software application module 112A executing a software application on the client device 110A receives a sports video recorded by the client device 110A and uploads the recorded sports video for action recognition to the action recognition server 200. The software application module 112A receives the action recognition results from the action recognition server 200 and provides the action recognition result for presentation to the user of the client device 110A.

In another embodiment, the software application module 112 of the client device 110 receives instructions from the action recognition server 200 to execute the software application to recognize the sports actions in a recorded sports video by the client device 110. The instructions from the action recognition server 200 includes instructions to apply a trained model associated with the type of the recorded sports video (e.g., baseball) to identify the set of key poses associated with the type of the sports videos from the sequence of video frames of the recorded sports video. Based on the analysis of the identified key poses in the recorded sports video, the software application module 120 determines whether one or more sports actions (e.g., baseball swings) have happened and locations in terms of frame numbers or timestamps of the identified sports actions in the recorded sports video.

The network 120 enables communications between the client devices 110 and the recognition server 200. In one embodiment, the network 120 comprises the Internet and uses standard communications technologies and/or protocols, e.g., clouding computing. In another embodiment, the network 120 can use custom and/or dedicated data communications technologies.

The action recognition server 200 is configured for recognizing sports actions in various types of sports videos. In one embodiment, the action recognition server 200 performs the action recognition in two stages: a training stage and an applications stage. In the training stage, the action recognition server 200 trains various feature models: a player detector, a set of key pose identifiers, and a meta classifier for each type of sports videos. The player detector is trained for detecting the location of the player in the video frames of a sports video. A set of key pose identifiers for each type of sports videos is trained to identify key poses associated with a target sport action associated with the type of sports video. The meta classifier is trained to determine whether a target sports action of a sport video has happened and when the action happened based on analysis of the set of key pose identifiers associated with the sports video. In the application stage, the action recognition server 200 applies the trained player detector, a set of key pose identifiers and the trained meta classifier to recognize one or more sports actions in an input sports video.

The action recognition server 200 illustrated in the embodiment of FIG. 1 includes a video database 210, a model database 220, a training module 230 and a recognition application module 240. Other embodiments of the recognition server 200 may include additional and/or different components. The video database 210 stores large corpuses of sports videos. In one embodiment, the video database 210 is partitioned to a training video database 212 and an input video database 214. The training video database 212 stores a large corpus of training sports videos that are used to train the feature models for different types of sports videos, e.g., baseball, golf and tennis. The training videos may be received by the training video database 212 from data sources such as the sports websites, online forums or search engines. The input video database 214 stores input sports videos that are uploaded by users or captured by cameras of the client devices 110 for sports action recognition.

The model database 220 stores different sets of trained feature models associated with different types of sports videos. It is noted that a sports action for a type of sports video, e.g., a baseball swing or golf swing, can be represented by a small set of distinctive key poses and an order of the distinctive key poses associated with that particular sports type. For example, a baseball swing action can be represented by three key poses: a pose representing begin swing, a pose representing hitting baseball (or ball impact), and a pose representing end swing. For each specific sports action associated with a sports type (e.g., golf, baseball), a set of trained feature models include a player detector, a set of key pose identifiers and a meta classifier. Training the different feature models by the training module 230 are further described below with reference to FIG. 4 through FIG. 7B.

The recognition application module 240 selects a specific set of feature models trained by the training module 230 for an input sports video based on the type of the input sports video, and applies the set of feature models to input sports video for real-time action recognition in the input sports video. The recognition application module 240 may also present the action recognition result in real-time to the user of the input sports video. The recognition application module 240 may also provide a final report indicating the action recognition result and related statistics to the user of the input sports video.

Figure 2A:
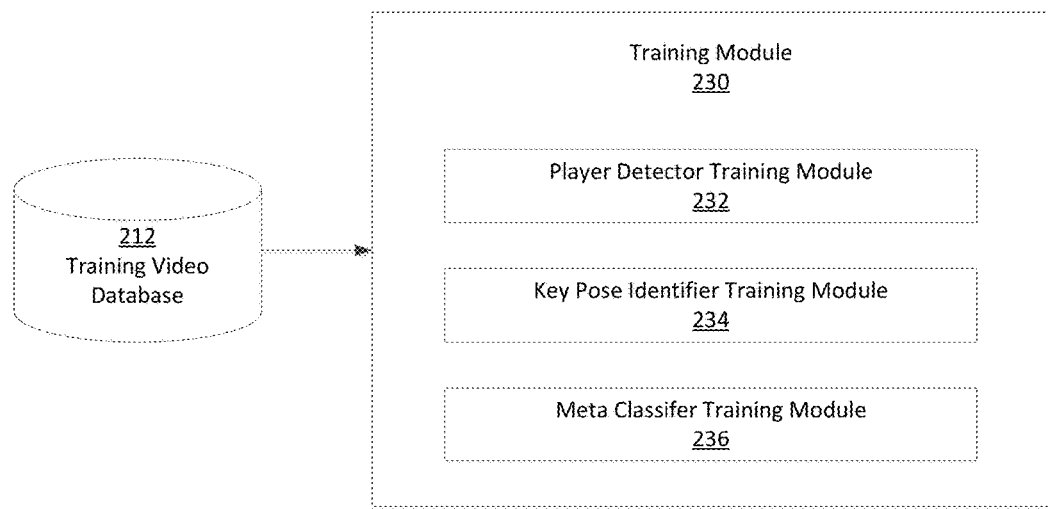
FIG. 2A shows a block diagram of a training module for training feature models using videos stored in a training video database illustrated in FIG. 1, according to one embodiment.

FIG. 2A shows a block diagram of a training module 230 for training feature models using videos stored in the training video database 212 illustrated in FIG. 1, according to one embodiment. The training module 230 illustrated in FIG. 2A includes a player detector training module 232, a key pose identifier training module 234 and a meta classifier training module 236. For a specific sports action of a sports video of a specific sports type, e.g., a baseball swing for a baseball video, the training module 230 trains a player detector to locate the player performing the specific sports action, and trains a set of key pose identifiers for identifying distinctive key poses representing the specific sports action. The training module 320 also trains a meta classifier for the sports action to determine whether the specific sports action has happened in the sports video based on the analysis of videos frames of the sports video by the key pose identifiers. The training module 230 may train different player detectors, different sets of key pose identifiers and different meta classifiers for different sports actions associated with different sports types. The trained feature models by the training module 230 are stored in the model database 220.

The player detector training module 232 trains a player detector to locate the player who performs a target sports action, e.g., a baseball swing, in a sports video. The player detector is to detect the location of the player in each video frame of a sports video, where the location of the player is indicated by a player region within which a player is located within a video frame of the sports video. In one embodiment, to train the player detector, the player detector training module 232 extracts low-level visual features representing players in a corpus of training videos. In one embodiment, the training videos include video frames with manually labeled player regions and video frames with random image regions. A manually labeled player region refers to a part of a video frame that contains a player within the part and is considered as a positive sample for the player detector training procedure. An example manually labeled player region can be a rectangular box in a video frame of a sports video within which a player is contained. A random image region of a video frame refers to a part of the video frame that does not contain a player within that part and is considered as a negative sample for the player detector training procedure. In one embodiment, a player detector is trained to distinguish the positive samples and the negative samples using classification techniques such as aggregated channel features (ACF features) and a boosted tree classifier. The ACF features are an aggregation of image features such as pixel intensities, gradient magnitudes and gradient orientations.

Figure 4:
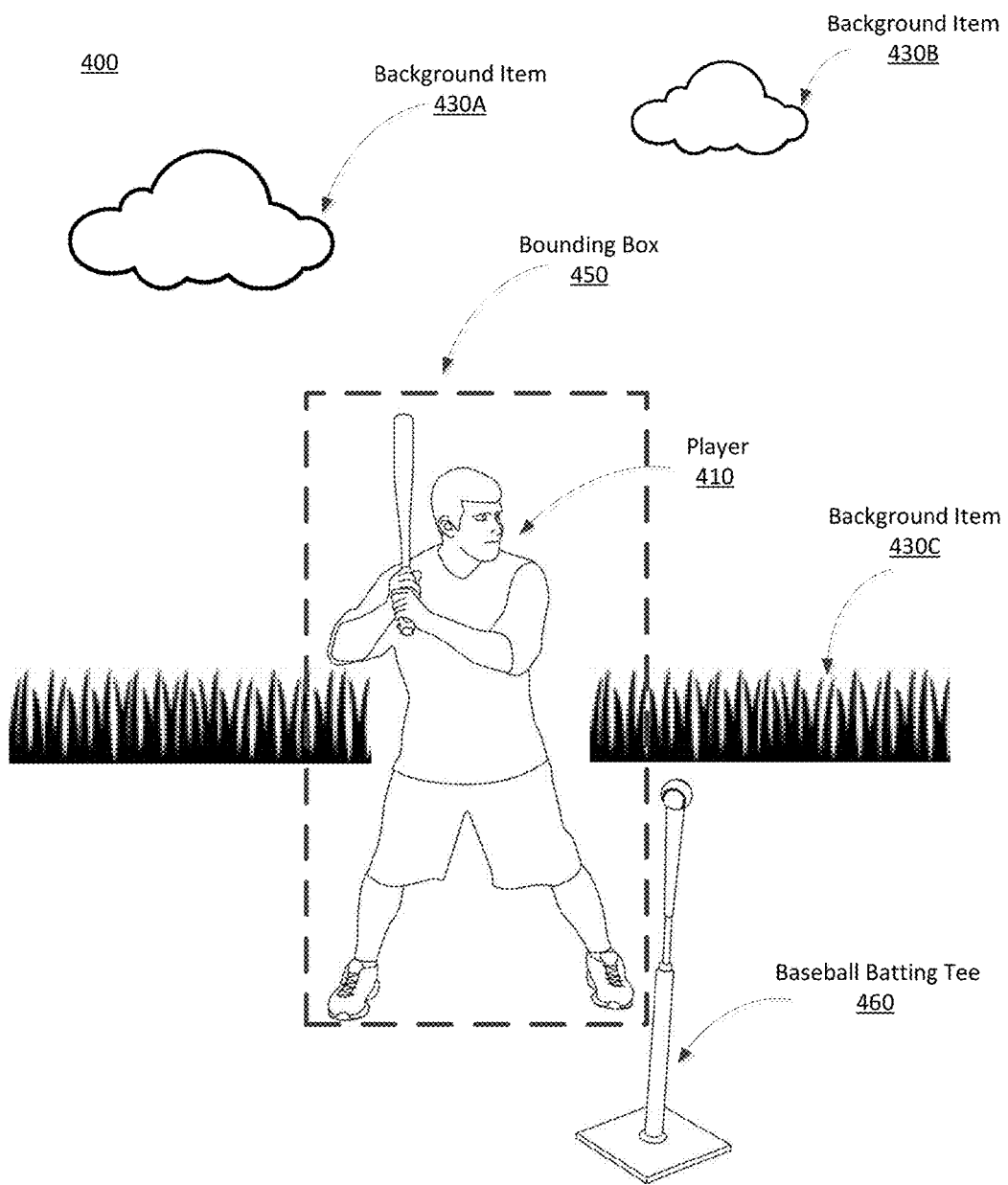
FIG. 4 shows an example of training a player detector for a baseball swing action, according to one embodiment.

Turning now to FIG. 4, FIG. 4 shows an example of training a player detector for a baseball swing action, according to one embodiment. The video frame 400 illustrated by FIG. 4 is from a video frame of a training video, and the video frame 400 shows a player 410 that is playing baseball. The video frame 400 has one or more background items 430, such as clouds in the sky 430A and 430B and grass 430C behind the player 410. In the example of FIG. 4, the player 410 is performing a baseball swing with a stationary baseball placed on the baseball batting tee 460 in front of the player. The location of the player 410 within the video frame 400 is defined by a rectangular bounding box 450.

The player detector trained by the player detection training module 232 is used to detect a player within a video frame of a sports video, for example, to detect the player 410 within the video frame 400. More specifically, the player detector determines the player's location within a video frame, for example, the player 410 is determined to be located within the rectangular bounding box 450 in the video frame 400. In one embodiment, the player detector training module 232 also determines a series of video frames of a sports video, each of which has a player detected, and the series of video frames can be selected for the key pose identifier training module 234 to train key pose identifiers, and for the meta classifier training module 236 to train meta classifiers.

The key pose identifier training module 234 trains a set of key pose identifiers, each key pose identifier is trained for identifying a corresponding key pose of a target sports action, such as a baseball swing, and the target sport action is represented by the corresponding key poses identified by the set of key pose identifiers. More specifically, for each video frame of a selected series of video frames of a sports video, each of the key pose identifiers is used to identify whether a corresponding key pose has happened and to provide a score indicating the possibility of the corresponding key pose happening within that video frame. For each of the key pose identifiers, a score sequence is generated for the selected series of video frames. The key pose identifier training module 234 then provides the meta classifier training module 236 with a set of score sequences generated by all the key pose identifiers to train a meta classifier.

In one embodiment, the key pose identifier training module 234 identifies a set of distinctive key poses that represent a target action of a sports video of a particular type and collects training data of the same type (e.g., baseball sports videos for training baseball swing key pose identifiers and golf sports videos for training golf swing key pose identifiers). For example, for baseball sports videos, the target action is baseball swing; for golf sports videos, the target video is golf swings. It is noted that a sports action for a type of sports video, e.g., a baseball swing or a golf swing, can be represented by a small set of distinctive key poses and an order of the distinctive key poses associated with that particular type sports. For example, a baseball swing action can be represented by three key poses: a pose representing begin swing, a pose representing hitting a baseball (or ball impact), and a pose representing end swing.

Figure 3A:
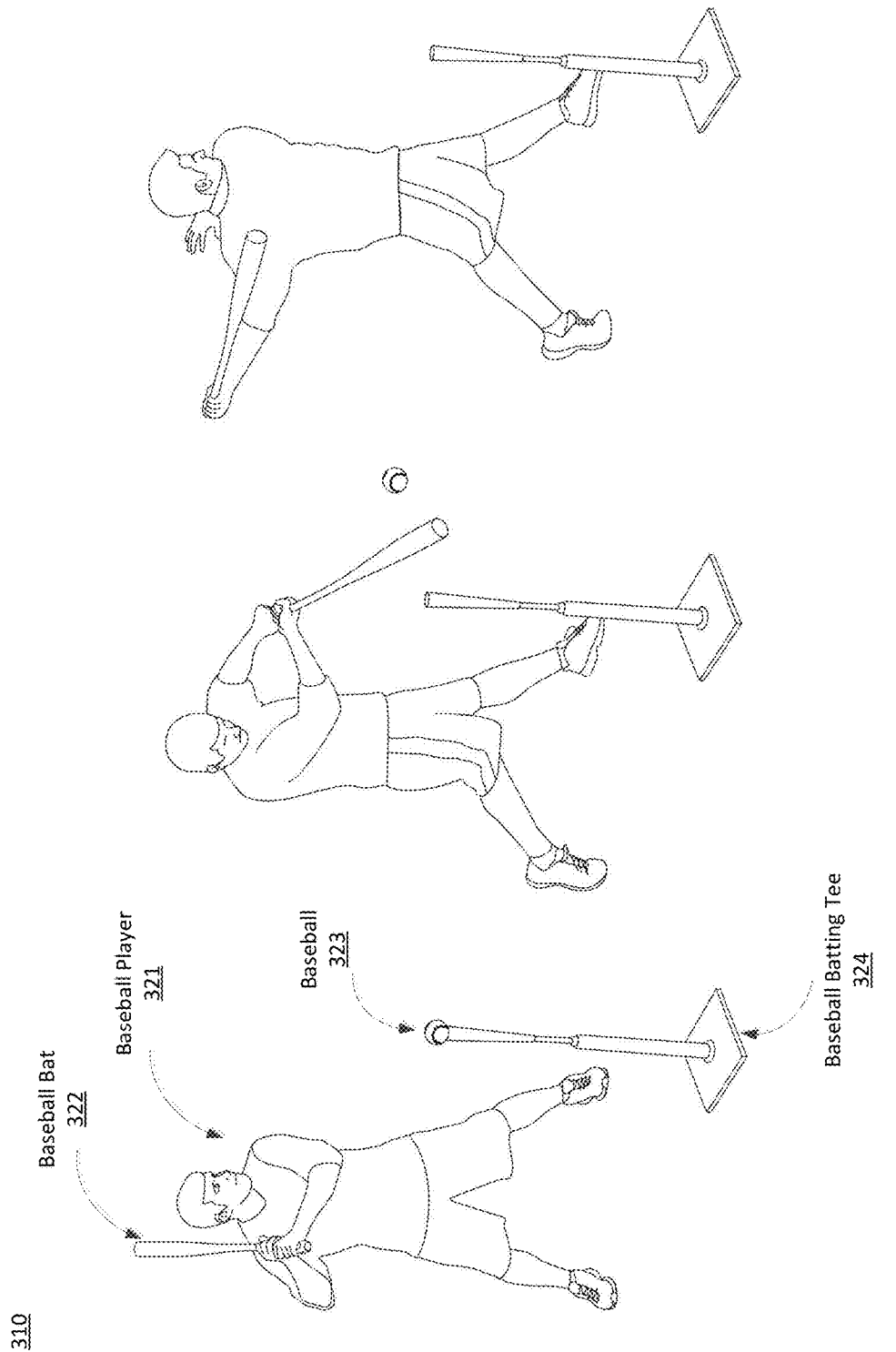
FIG. 3A shows an example of three key poses representing a baseball swing action, according to one embodiment.

FIG. 3A shows an example of baseball swing action represented by three key poses performed by a player, according to one embodiment. The baseball swing action 310 illustrated in FIG. 3A includes three different key poses, which are a begin pose 312, an impact pose 314 and an end pose 316. The example of FIG. 3A also shows a baseball player 321, a baseball bat 322 held by the player, a baseball 323 that is to be hit by the baseball bat, and a baseball batting tee 324 that is a sports equipment used to support a stationary baseball such that the player can strike the stationary baseball when practicing baseball swings.

The begin pose 312 illustrated in FIG. 3A shows that the player 321 lifts up the baseball bat 322 and is about to swing the baseball bat to strike the baseball 323 placed on the baseball batting tee 324 in front of the player. The impact pose 314 shows the moment that the player 321 strikes the baseball 323 using his baseball bat 322 and the baseball is traveling away from the player as it is hit by the baseball bat. The end pose 316 shows that the player 321 finishes striking the baseball 323 with a body rotation taking place in the arms, hip and spine and with one hand released from the baseball bat 322.

Other embodiments may show additional and/or different components in FIG. 3A. For example, in an alternative embodiment to describe the baseball swing action, a baseball player may try to strike a baseball that is traveling towards the player instead of a stationary baseball being placed on a baseball batting tee set in front of the player. Additionally, additional or fewer key poses not shown in FIG. 3A may be included in the set of key poses representing a baseball swing action in other embodiments. Likewise, other types of body movement of the player to perform a baseball swing action not shown in FIG. 3A may be included in the set of key poses representing the baseball swing action.

For golf swing action in golf sports videos, a golf swing action can be represented by four key poses: a pose representing begin swing, a pose representing upward movement, a pose representing hitting a golf ball (or ball impact), and a pose representing end swing.

Figure 3B:
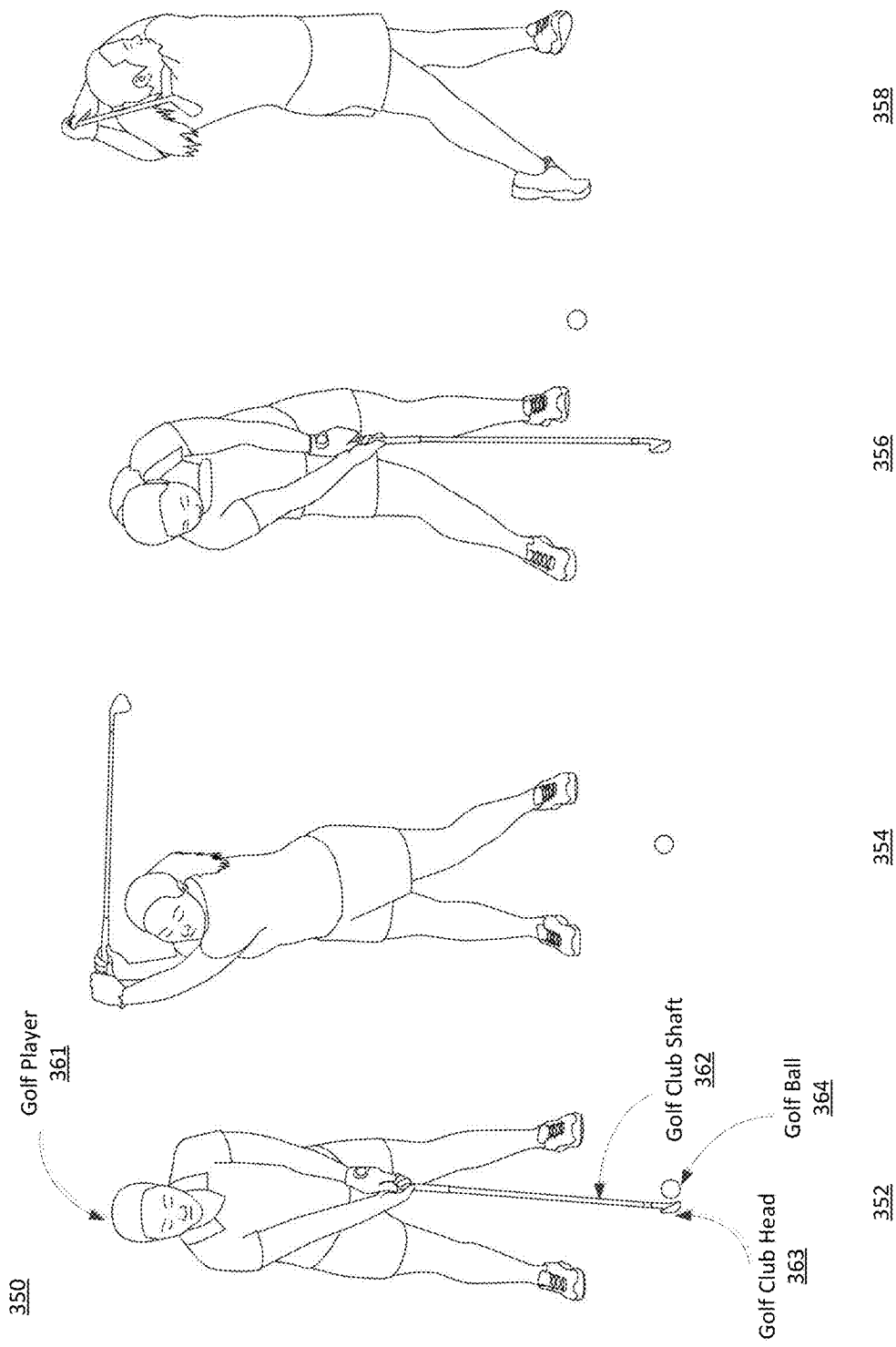
FIG. 3B shows an example of four key poses representing a golf swing action, according to one embodiment.

FIG. 3B shows an example of golf swing action represented by four key poses performed by a player, according to one embodiment. The golf swing action 350 illustrated in FIG. 3B includes four different key poses, which are a begin pose 352, an upswing pose 354, an impact pose 356, and an end pose 358. The example of FIG. 3B also shows a golf player 361, a golf club shaft 362 that is held by the player with a golf club head 363, and a golf ball 364 that is to be hit by the golf club shaft.

The begin pose 352 shows that the player 361 is standing in front of the golf ball 364, gripping the golf club shaft 362, and the golf club head 363 is placed on the ground behind the golf ball 364. The upswing pose 354 shows that the player 361 lifts up the golf club shaft 362 with the shoulders turning back fully, and the player is about to have a quick downswing to strike the golf ball 364. The impact pose 356 shows the moment that the player 361 strikes the golf ball 364 using the golf club shaft 362 after down swinging the golf club shaft from an upswing pose 354, and the golf ball is travelling away from the player as it is hit by the golf club head 363. The end pose 358 shows the player 361 finishes striking the golf ball 364 with the arms rotating and lifting back.

Referring back to FIG. 2A, for each target sports action, the key pose identifier training module 234 trains a set of key pose identifiers, each of which is trained for identifying a corresponding key pose of the target sports action. For example, for a baseball swing, the key pose identifier training module 234 trains three key pose identifiers: one for begin pose, one for impact pose and one for end pose. In one embodiment, the key pose identifier training module 234 uses both positive and negative training samples for training each key pose identifier. A positive training sample for training a key pose identifier for a target key pose is a video frame, where a player detected in a player region performs the target key pose; a negative training sample refers to a video frame, where a player detected in a player region performs an action other than the target key pose. Taking baseball swing as an example, to train a key pose identifier for a begin swing pose, a video frame showing a player performing a begin swing is considered as a positive sample, while a video frame showing a player hitting a baseball or performing an end swing is considered a negative sample.

Figure 5:
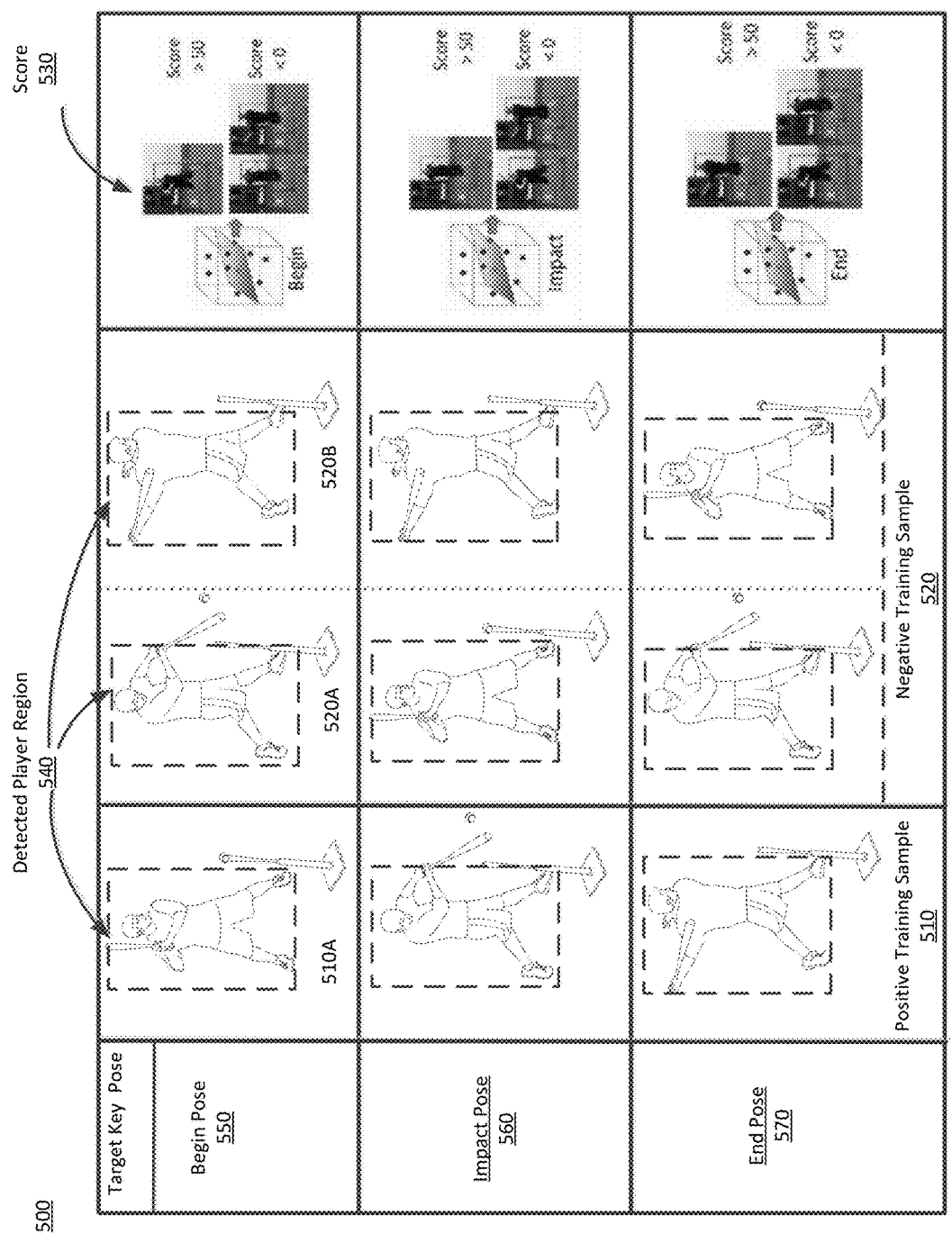
FIG. 5 shows an example of training a set of key pose identifiers for the baseball swing action illustrated in FIG. 3A, according to one embodiment.

FIG. 5 shows an example of training a set of key pose identifiers for the baseball swing action illustrated in FIG. 3A, according to one embodiment. FIG. 5 shows, for each key pose of a baseball swing action, positive training samples 510, negative training samples 520, and scores 530. The key poses for baseball swing action illustrated in FIG. 5 are: a begin pose 550, an impact pose 560 and an end pose 570 as described above.

For each of the key poses, a key pose identifier is trained using both positive and negative training samples. In the example shown in FIG. 5, for the target begin pose 550, a positive training sample 510A is a begin pose performed by the player within the detected player region 540 of the video frame, and negative training samples 520 include an impact pose 520A and an end pose 520B performed by the player within the detected player regions 540 of the corresponding video frames. Likewise, for the target impact pose 560, a positive training sample 510 is an impact pose and a begin pose and an end pose are negative training samples 520. For the target end pose 570, a positive training sample 510 is an end pose and a begin pose and an impact pose are negative training samples 520.

After the positive training samples 510 and negative training samples 520 are determined, the key pose identifier training module 234 extracts visual features from feature extraction regions (e.g., histogram values of pixels in the regions) of both positive training samples and negative training samples. A feature extraction region is a selected region in a video frame, from which visual features are extracted to train key pose identifiers. Feature extraction regions can be generated or defined in different ways to achieve different performances of action recognition results by the trained feature models that are applied to input sports videos in real-time. In one embodiment, a feature extraction region can be a detected player region of a video frame that is determined by the trained player detector. In another embodiment, a feature extraction region can be a region manually labeled by human inspectors, for example, a bounding box of a selection region that is manually labeled in a video frame by a human. Both ways of generating feature extraction regions can be jointly used to improve sports action recognition performance. According to testing statistics for one example test, as responsive to both methods of feature extraction regions generation being combined in use to train key pose identifiers, a 2.5% increase of action recognition rate is found compared with using only the detected player region determined by the player detector, and a 4.0% increase of action recognition rate is found compared with using only human-labeled region.

Additionally, to reduce noise from the human labeling method to generate feature extraction regions, a jittering procedure can be applied to produce a better performance of training the key pose identifiers for future real-time action recognition. The jittering procedure is a data augmentation method that is used in machine learning technologies to enlarge training sample set for reducing overfitting. For example, in a jittering procedure, the center of the human labeled bounding box can be moved in a horizontal direction and/or a vertical direction by a small amount. This small amount can be a random amount that is no larger than 2% of the maximum of width of the bounding box if the center is moved in a horizontal way, or smaller than 2% of the maximum of height of the bounding box if the center is moved in a vertical way. In one embodiment, the jittering procedure applies a fixed amount of movement, e.g., 4 pixels in each horizontal and vertical direction.

To train a key pose identifier for a corresponding target pose with video frames of a training video, the key pose identifier training module 234 generates a score, e.g., a real-valued score, for each video frame based on a comparison of visual features extracted from the feature extraction region of the video frame and visual features representing the target pose. The real-valued score associated with a video frame indicates a likelihood that a player in the video frame is performing the target pose. A training video frame that is a positive training sample for the target key pose should receive a relatively higher score compared to a training video frame that is a negative training sample for the target key pose. In the example shown in FIG. 5, for the target begin pose 550, the positive sample receives a score higher than 50 and the two negative samples receive scores lower than 0. A threshold value may be determined for each key pose identifier to distinguish between a positive sample from a negative sample when the key pose identifier is applied for future training and real-time sports action recognition. The trained key pose identifier for a target key pose generates a real-valued score for each video frame of an input video, where the score indicates how likely a player in the video frame is performing the target key pose.

Figure 6:
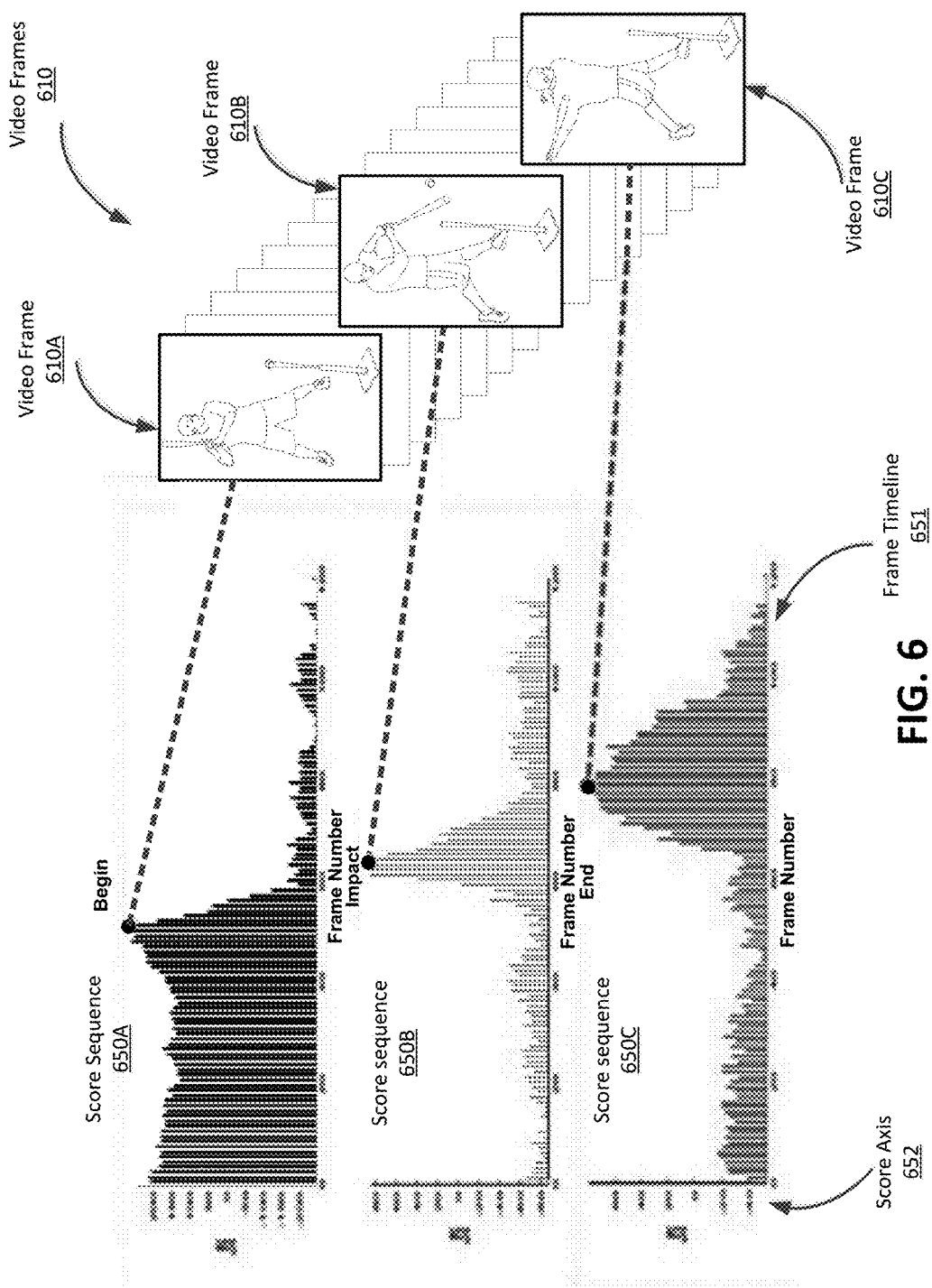
FIG. 6 shows a frame-by-frame analysis of score sequences for the three key poses representing a baseball swing action illustrated in FIG. 3A, according to one embodiment.

FIG. 6 shows a frame-by-frame analysis of score sequences generated by the set of trained key pose identifiers for the three key poses representing a baseball swing action illustrated in FIG. 3A, according to one embodiment. In the embodiment of FIG. 6, a sequence of continuous video frames 610 of a baseball sports video and three score sequences 650A, 650B and 650C, corresponding to the three key pose identifiers for a baseball swing action are shown. The video frame 610A represents a video frame showing a pose that best matches a begin pose for baseball swing action because it has the highest score among other video frames shown in the score sequence 650A for the begin pose, the video frame 610B represents a video frame showing a pose that best matches an impact pose for baseball swing action because it has the highest score among other video frames shown in the score sequence 650B for the impact pose, and the video frame 610C represents a video frame showing a pose that best matches an end pose for baseball swing action because it has the highest score among other video frames shown in the score sequence 650C for the end pose.

Each of the score sequences 650A-C further includes a frame timeline 651 as a horizontal axis, and a score axis 652 as a vertical axis. The frame timeline 651 shows, for each frame, a frame label and a relative location in terms of timestamp of the frame among the whole sequence of video frames 610. The score axis 652 shows, for each frame, a score generated by a trained key pose identifier, which indicates how well the pose shown by that frame matches the key pose identified by the key pose identifier, and which further indicates how likely the key pose has happened within that frame. The example illustrated in FIG. 6 also shows that, in score sequence 650A for begin pose of a baseball swing action, the video frames 610 that are located on around the first half of the frame timeline 651 have relatively higher scores compared with video frames that are located on the second half of the frame timeline because it is highly probable that the being pose or the poses similar to that has happened before the other two key poses, impact pose and end pose.

Similarly, score sequence 650B for impact pose shows, the video frames 610 that are located on around middle part of the frame timeline 651 have relatively higher scores compared with video frames that are located on other parts of the frame timeline, because it is highly probable that the impact pose or the poses similar to that happen after the begin pose and before the end pose.

Score sequence 650C for end pose shows, the video frames 610 located around the latter part of the frame timeline 651 have relatively higher scores compared with video frames that are located on other parts of the frame timeline because the end pose or the poses similar are most likely to happen after both the begin pose and the end pose.

Referring back to FIG. 2A, the meta classifier module 236 trains a meta classifier to analyze the score sequences generated by the trained key pose identifiers to determine whether a target sports action by a player has happened within a selected series of video frames and to locate the sports action on the timeline of the video frames if the target sports action has happened. In one embodiment, the meta classifier module 236 trains a meta classifier for a target sports action by applying a time window of a predefined width over a real-valued vector, that includes the score sequences for all key poses identified for the target sport action, and slides the time window along an axis of the score sequences stacked together. A portion of the stacked score sequences, that includes the highest score for each key pose within the same time window is identified as the portion of the corresponding sports video, where the target sport action occurred.

In one embodiment, the meta classifier being trained is a support vector machine (SVM) machine learning model, which produces a score measuring how likely a real-valued score associated with the key poses of a sports action matches a sports action. The meta classifier module 236 can also use a validation sample set to determine a threshold to further classify the real-valued score result generated by the SVM to a "positive" result or a "negative" result. A positive result indicates a sports action has happened and a negative result indicates a sports action hasn't happened.

Figure 7A:
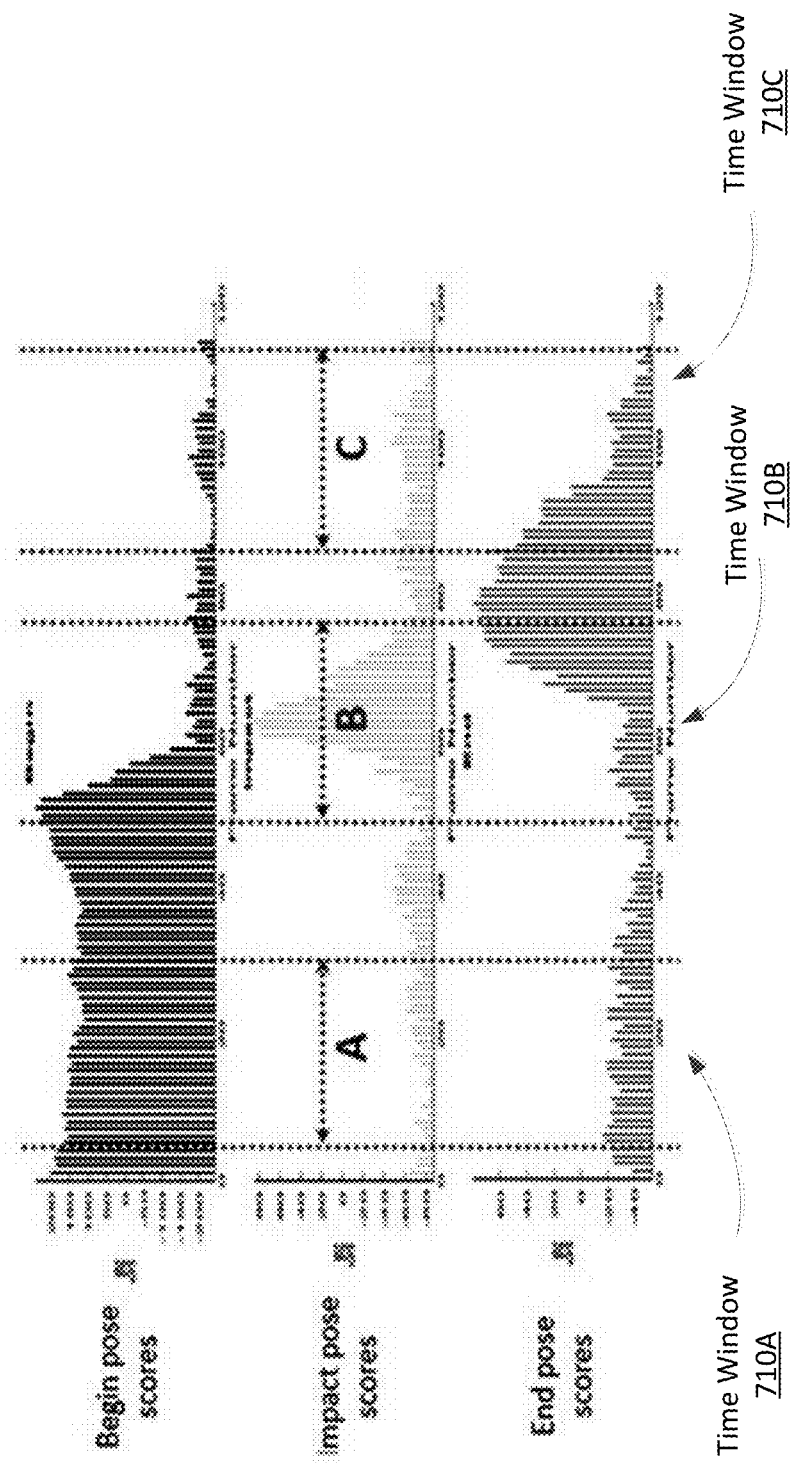
FIG. 7A shows training a meta classifier by applying a time window to the score sequences generated by key pose identifiers for a baseball swing action illustrated in FIG. 6, according to one embodiment.

FIG. 7A shows training a meta classifier by applying a time window to the score sequences generated by key pose identifiers for a baseball swing action illustrated in FIG. 6, according to one embodiment. The embodiment illustrated in FIG. 7A also shows that the three score sequences for the three key poses for baseball swing sports action are aligned according to the frame timeline with time windows 710 applied to each of the score sequences. Time windows 710 (e.g., 710A, 710B and 710C) are used to generate training samples for training the meta classifier. In one embodiment, a training sample for a meta classifier is a real-valued vector of sequence scores for all key poses within a same time window, and the real-valued vector reflects a part of the score sequences of each key pose within a same time window. In other words, for the meta classifier, a positive training sample refers to a training sample, where its corresponding time window covers the entire period of the sports action, and the highest scores generated by each of the key pose identifiers are all included in the selected time window. As more fully described below in FIG. 7B, the part of the score sequences for each key pose are placed in the real-valued vector in an order that reflects an order the player performs the whole sports action, for example, in an order of the begin pose, the impact pose and the end pose for a baseball swing action.

Figure 7B:
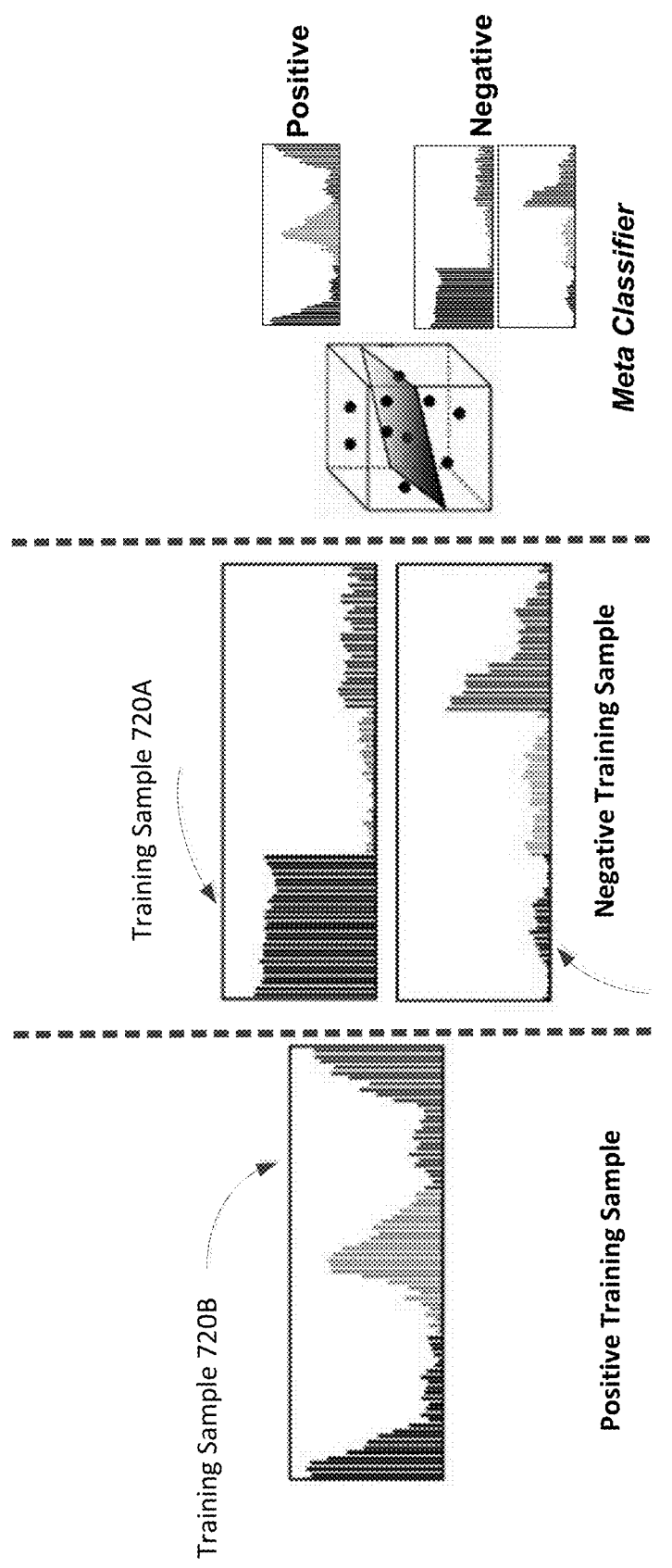
FIG. 7B shows example training results from training the meta classifier illustrated in FIG. 7A, according to one embodiment.

FIG. 7B shows example training samples of the meta classifier shown in FIG. 7A, according to one embodiment. The example illustrated in FIG. 7B shows a training sample 720A that corresponds to the time window 710A in FIG. 7A, a training sample 720B corresponds to the time window 710B in FIG. 7A, and a training sample 720C corresponds to a time window 710C in FIG. 7A. For example, training sample 720B shown in FIG. 7B is a positive training sample, which covers the three highest scores generated by all the three key pose identifiers, and which further indicates that the entire period of the baseball swing action is covered in the selected time window 710B. In contrast, training sample 720A and training sample 720C are negative training samples since not all three highest scores generated by all the three key pose identifiers are covered in the corresponding time windows 710B and 710C, which further indicates the entire period of the sports action is nether covered by time window 710A nor time window 710C.

Figure 8:
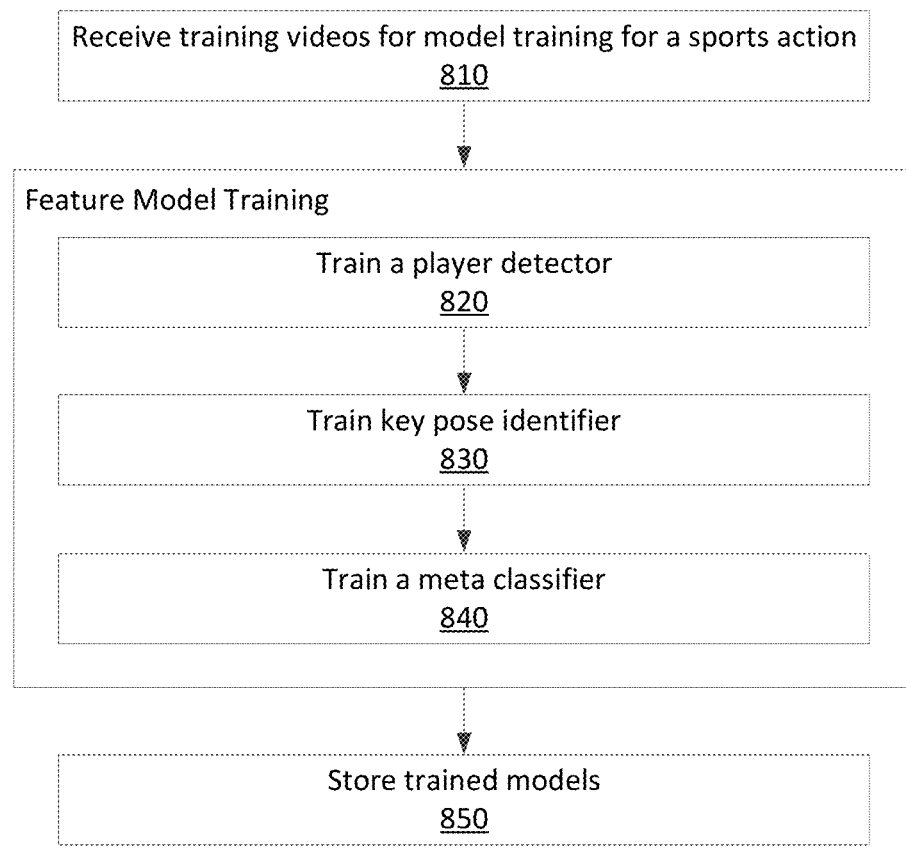
FIG. 8 shows a flow chart illustrating a process of training feature models illustrated in FIG. 4-FIG. 7B, according to one embodiment.

FIG. 8 shows a flow chart illustrating a process of training feature models illustrated in FIG. 4-FIG. 7B, according to one embodiment. Initially, the training module 230 receives 810 training videos for training a player detector, a set of key pose identifiers and a meta classifier for a specific sports action associated with a specific sports type. A training video may include multiple video frames that captures a player's actions associated with the specific sports type, e.g., playing baseball. The training module 230 trains 820 a player detector to detect a player within a video frame and to determine a player region within which the player is located in the video frame. The training module 230 trains 830 a set of key pose identifiers to identify key poses for the specific sports action and to produce scores indicating how well a pose recorded in a video frame matches each of the key poses. The training module 230 trains 840 a meta classifier to analyze the scores produced by the trained key pose identifiers and to produce a final result about how likely a sports action has happened during a video and to locate the sports action with respect to the video frame timeline of the video if the sports action has happened. The trained models, including the player detector, the set of key pose identifiers, and the meta classifier, are stored 850 for future real-time action recognition for input sports videos. In alternative embodiments not shown in FIG. 8, different sets of feature models can be trained for different sports actions associated with different sports types.

Turning back to FIG. 2B, FIG. 2B shows a block diagram of a recognition application module 240 for applying trained feature models to an input video stored in an input video database illustrated in FIG. 1. In other embodiments, the recognition application module 240 is located at the client device 110, and function as the software application module 112. The input video database 214 provides the recognition application module 240 with input sports videos for real-time action recognition. In one embodiment, the input video database 214 provides the recognition application module 240 with a complete input sports video after all the video frames of the input sports videos are received from a user. In another embodiment, as each video frame of the input sports video is received from the user, the input video database 214 provides the video frame for the recognition application module 240. For example, while the user is recording a sports video with a client device 110 when the user or another different user is playing a certain sports, the client device 110 uploads each frame to the input video database 214 as each frame of the video is captured by a camera embedded with the client device 110, and at the same time, each frame received by the input video database is provided to the recognition application module 240 for real-time action recognition. The action recognition module 240 may also provide the user with real-time recognition result as each frame is received and analyzed by the feature models.

Figure 2B:
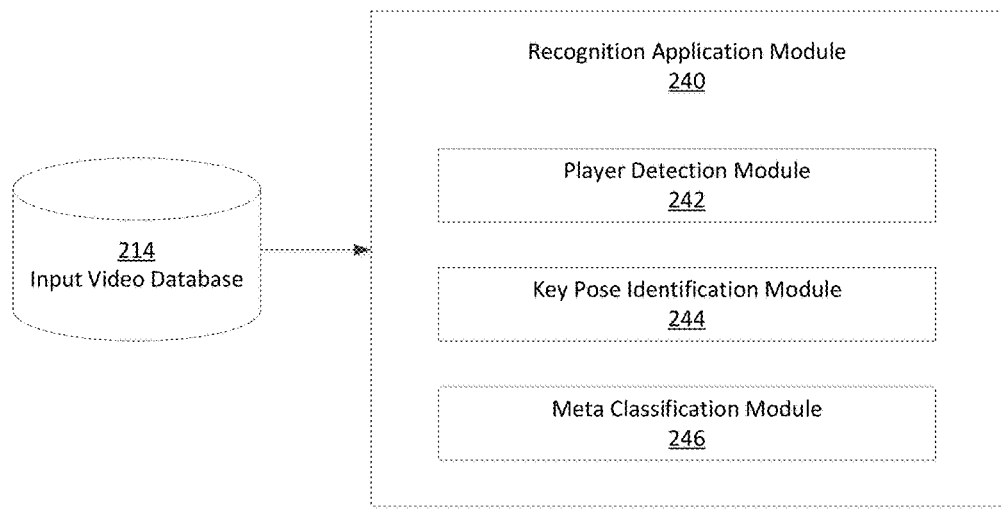
FIG. 2B shows a block diagram of a recognition application module for applying trained feature models to an input video stored in an input video database illustrated in FIG. 1, according to one embodiment.

The recognition application module 240 illustrated in FIG. 2B includes a player detection module 242, a key pose identification module 244, and a meta classification module 246. After the recognition application module 240 receives an input sports video from the input video database 214 for action recognition for a specific sports action associated with a specific sports type, the recognition application module 240 selects from the model database 220 a set of trained feature models corresponding to the specific sports action associated with the specific sport types and applies the selected feature models to the received input sports video. The selected feature models include a player detector, a set of key pose identifiers, and a meta classifier for the specific sports action.

The player detection module 242 detects, within each video frame of an input video, a player region within which a player is detected using the trained player detector. The player detection module 242 can also select one or more video frames from the input video based on the player detection, where the selected video frames are used by the key pose identification module 244 and the meta classification module 246.

The key pose identification module 244 uses a set of trained key poses identifiers associated with the specific sports action to extract features from a feature extraction region within each video frame of the input video. The key pose identification module 244 applies the trained key pose identifiers to generate a score sequence for each key pose of the set of key poses representing the specific sport action.

The meta classification module 246 applies the trained meta classifier to the score sequences generated by the key pose identification module 244 to determine whether the specific sports action has occurred and where (in terms of timestamps of the video frames) the action has occurred. The recognition application module 240 generates action recognition result based on the applications of the trained feature models and presents the result to the user of the client device 110.

In one embodiment, as described above, the recognition application module 240 applies trained feature models and generates action recognition result in an efficient way that as each video frame of the input sports video is continuously received from the input video database 214, the recognition application module 240 can detect whether a player is within the video frame and generates scores by the different key pose identifiers for that frame, and the action recognition result is also updated by the trained meta classifier. The real-time action recognition result is provided by the recognition application module 240 to the user as video frames of the input sports video are continuously received and analyzed.

Figure 9:
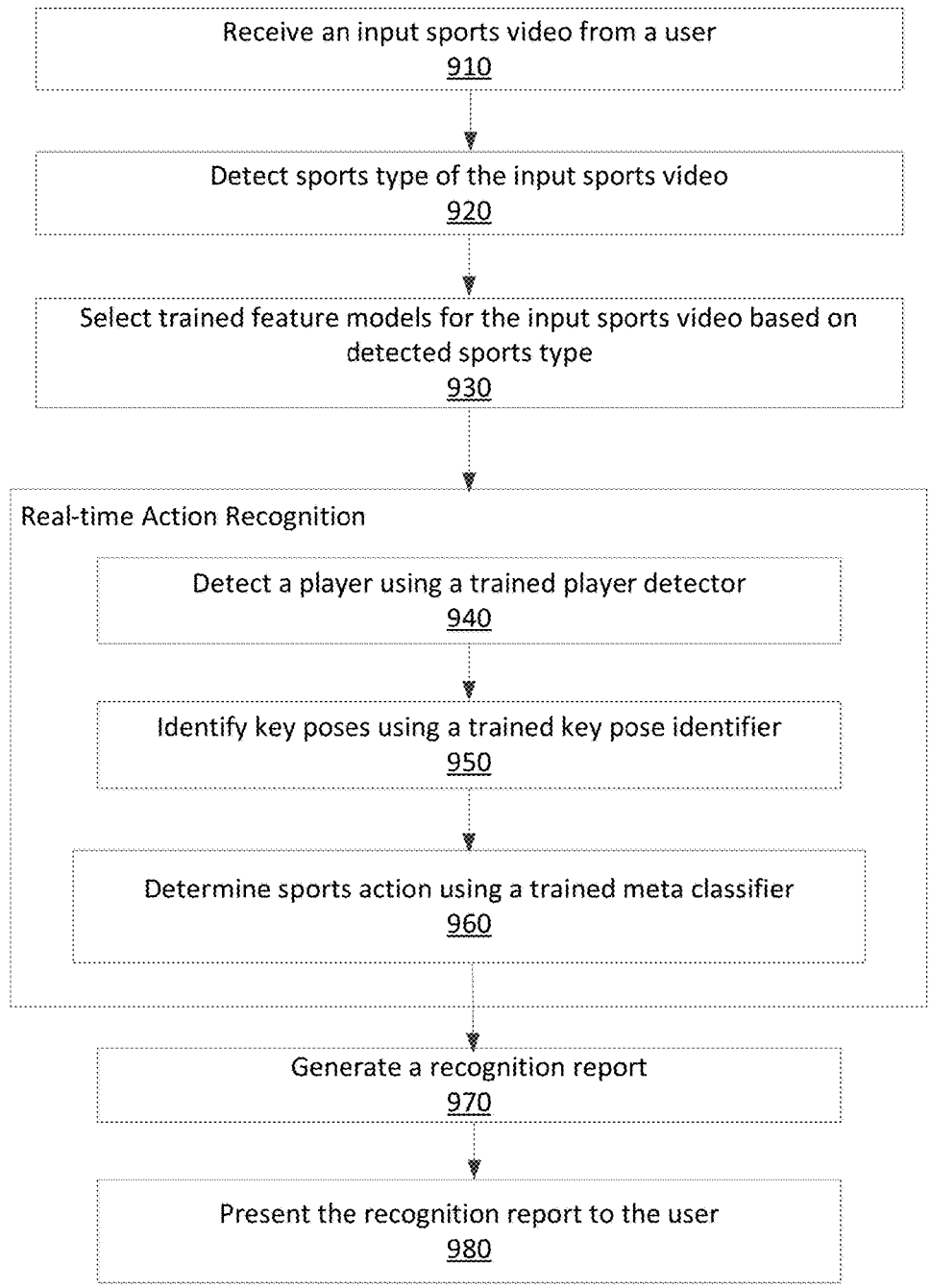
FIG. 9 shows a flow chart illustrating a process of real-time action recognition using the trained feature models, according to one embodiment.

FIG. 9 shows a flow chart illustrating a process of real-time action recognition by the recognition application module 240 using the trained feature models shown in FIG. 8, according to one embodiment. In the embodiment shown in FIG. 9, the recognition application module 240 receives an input sports video 910 from a user requesting action recognition for the input sports video. A sports type of the input sports video is detected 920 and a set of trained feature models are selected 930 for the received input sports video based on the detected sports type, e.g., a baseball swing action for a baseball sports video. The set of selected feature models include a player detector, a set of key pose identifiers and a meta classifier for the sports type of the input sports video.

The recognition application module 240 applies the set of selected feature models to the input sports video. At first, the recognition application module 240 applies the trained player detector to detect 940 a player recorded in each video frame of the input sports video. The recognition application module 240 detects a player region, where a player is detected in a video frame and from which features of the video frame are extracted for later use by trained key pose identifiers and meta classifier. The recognition application module 240 applies the set of selected trained key pose identifiers to identify 950 the key poses performed by the detected player within the detected player region. More specifically, the features extracted in 940 may be fed into the key pose identifiers to generate score sequences for each key pose of the sports action, indicating how well a pose in a video frame of the input sports video matches each of the key poses of the sports action. After the score sequences are generated by the key pose identifiers, the recognition application module 240 applies the trained meta classifier to determine 960 whether a sports action has happened in the input sports video. The meta classifier also locates the sports action in the input sports video using a time window of a predefined width.

The recognition application module 240 generates 970 an action recognition report showing whether the sports action has happened in the input sports video and location of the sports action. The recognition report is presented 980 to the user to consume.

In one embodiment, the action recognition report is presented to the user in real-time as each video frame of the input sports video is received. As one example, after the input sports video is uploaded to the system, the input sports video with a complete series of video frames may be stored in the system and then analyzed by applying the trained feature models. As another example, as the system receives a new video frame, the trained key pose identifiers produce scores for that video frame, and the trained meta classifier updates the time window selected for the real-valued vector including the real-valued scores for each key pose and updates the recognition result with the newly added scores of this frame. In this case, the user can receive a real-time recognition result from the system as each frame of the sports video is received by the system.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for action recognition in a sports video, the method comprising:
  receiving a plurality of training videos, each of the training videos associated with a sports type, and each of the training videos including a plurality of video frames;
  training, for each sports type of a plurality of different sports types, one or more feature models using the plurality of the training videos, the training comprising:
    training a player detector for detecting location of a player in each video frame of a training video;
    training a set of key pose identifiers for a sports action distinctively associated with each sports type of the sports videos, the sports action associated with each sports type of the sports videos being represented by a set of distinctive poses; and
    training a meta classifier for determining a likelihood that the sports action has happened in a training video based on identification result by the trained set of key pose identifiers;
  selecting one or more trained feature models that are associated with a sports type of an input video; and
  applying the selected trained feature models to a plurality of video frames of the input video to recognize a sports action captured by the input video.

2. The method of claim 1, wherein training a player detector comprises:
  determining, for each of the video frames of a training video, a player region within the video frame, within which a player is detected; and
  selecting a series of video frames within which the player regions are determined.

3. The method of claim 2, wherein the player region is a rectangular bounding box within the video frame, within which the player is detected.

4. The method of claim 1, wherein training a set of key pose identifiers for a sports action comprises:
for each distinctive pose of the sports action:
identifying a set of positive training samples and a set of negative training samples from the plurality of training videos, a positive training sample comprising a video frame showing a player performing the distinctive pose of the sports action, and a negative training sample comprising a video frame showing a player not performing the distinctive pose of the sports action;
extracting visual features from video frames corresponding to the set of positive training samples and to the set of negative training samples;
comparing the extracted visual features with visual features associated with the distinctive pose of the sports action;
generating a score for each video frame based on the comparison, the score indicating how well a pose detected in the each video frame matches the distinctive pose of the sports action.

5. The method of claim 1, wherein training a meta classifier comprises:
for each distinctive pose of the sports action:
applying a time window of a pre-defined width to a score sequence associated with the corresponding distinctive pose, the score sequence associated with the corresponding distinctive pose comprising a plurality of scores generated for a set of video frames of a training video selected by the set of key pose identifiers; and
determining whether the distinctive pose of the sports action has happened in the training video based on the application of the time window.

6. The method of claim 5, further comprising:
determining whether the sports action has happened in the training video based on the determination for each distinctive pose of the sports action.

7. The method of claim 1, wherein a sports type of the plurality of different sports types is baseball, and wherein a sports action associated with a baseball sports video is a baseball swing.

8. The method of claim 7, wherein the baseball swing is represented by a set of three distinctive poses, comprising:
a begin pose, the begin pose representing a player lifting a baseball bat before striking a baseball;
an impact pose, the impact pose representing the player striking the baseball with the baseball bat; and
an end pose, the end pose representing the player finishing striking the baseball with a body rotation.

9. The method of claim 1, wherein applying the selected trained feature models to a plurality of video frames of the input video comprises:
applying a trained player detector to the plurality of video frames of the input video;
applying a set of trained key pose identifiers associated with the sports type of the input video to the plurality of video frames of the input video; and
applying a trained meta classifier to a score sequence generated by the set of trained key pose identifiers.

10. The method of claim 9, further comprising:
generating a report for presentation to a user based on the application of the trained feature models, the report describing recognition result of the sports action in the input video.

11. A non-transitory computer readable storage medium storing computer program instructions, the computer program instructions when executed by a computer processor causes the processor to perform the steps of:
receiving a plurality of training videos, each of the training videos associated with a sports type, and each of the training videos including a plurality of video frames;
training, for each sports type of a plurality of different sports types, one or more feature models using the plurality of the training videos, the training comprising:
training a player detector for detecting location of a player in each video frame of a training video;
training a set of key pose identifiers for a sports action distinctively associated with each sports type of the sports videos, the sports action associated with each sports type of the sports videos being represented by a set of distinctive poses; and
training a meta classifier for determining a likelihood that the sports action has happened in a training video based on identification result by the trained set of key pose identifiers;
selecting one or more trained feature models that are associated with a sports type of an input video; and
applying the selected trained feature models to a plurality of video frames of the input video to recognize a sports action captured by the input video.

12. The non-transitory computer readable storage medium claim 11, wherein training a player detector comprises:
determining, for each of the video frames of a training video, a player region within the video frame, within which a player is detected; and
selecting a series of video frames within which the player regions are determined.

13. The non-transitory computer readable storage medium of claim 12, wherein the player region is a rectangular bounding box within the video frame, within which the player is detected.

14. The non-transitory computer readable storage medium of claim 11, wherein training a set of key pose identifiers for a sports action comprises:
for each distinctive pose of the sports action:
identifying a set of positive training samples and a set of negative training samples from the plurality of training videos, a positive training sample comprising a video frame showing a player performing the distinctive pose of the sports action, and a negative training sample comprising a video frame showing a player not performing the distinctive pose of the sports action;
extracting visual features from video frames corresponding to the set of positive training samples and to the set of negative training samples;
comparing the extracted visual features with visual features associated with the distinctive pose of the sports action;
generating a score for each video frame based on the comparison, the score indicating how well a pose detected in the each video frame matches the distinctive pose of the sports action.

15. The non-transitory computer readable storage medium of claim 11, wherein training a meta classifier comprises:
for each distinctive pose of the sports action:
applying a time window of a pre-defined width to a score sequence associated with the corresponding distinctive pose, the score sequence associated with the corresponding distinctive pose comprising a plurality of scores generated for a set of video frames of a training video selected by the set of key pose identifiers; and determining whether the distinctive pose of the sports action has happened in the training video based on the application of the time window.

16. The non-transitory computer readable storage medium of claim 15, further comprising:

determining whether the sports action has happened in the training video based on the determination for each distinctive pose of the sports action.

17. The non-transitory computer readable storage medium of claim 11, wherein a sports type of the plurality of different sports types is baseball, and wherein a sports action associated with a baseball sports video is a baseball swing.

18. The non-transitory computer readable storage medium of claim 17, wherein the baseball swing is represented by a set of three distinctive poses, comprising:

a begin pose, the begin pose representing a player lifting a baseball bat before striking a baseball;

an impact pose, the impact pose representing the player striking the baseball with the baseball bat; and an end pose, the end pose representing the player finishing striking the baseball with a body rotation.

19. The non-transitory computer readable storage medium of claim 11, wherein applying the selected trained feature models to a plurality of video frames of the input video comprises:

applying a trained player detector to the plurality of video frames of the input video;

applying a set of trained key pose identifiers associated with the sports type of the input video to the plurality of video frames of the input video; and applying a trained meta classifier to a score sequence generated by the set of trained key pose identifiers.

20. The non-transitory computer readable storage medium of claim 19, further comprising:

generating a report for presentation to a user based on the application of the trained feature models, the report describing recognition result of the sports action in the input video.

* * * * *

UNITED STATES PATENT AND TRADEMARK OFFICE
CERTIFICATE OF CORRECTION

PATENT NO. : 9,600,717 B1  
APPLICATION NO. : 15/053773  
DATED : March 21, 2017  
INVENTOR(S) : Xiaowei Dai et al.

Page 1 of 1

It is certified that error appears in the above-identified patent and that said Letters Patent is hereby corrected as shown below:

In the Claims

- At Column 15, Lines 16, delete "action;" and add --action; and--
- At Column 16, Line 56, delete "sports action;" and add --sports action; and--

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*